US008559499B2

(12) United States Patent
Mallat et al.

(10) Patent No.: US 8,559,499 B2
(45) Date of Patent: *Oct. 15, 2013

(54) FRAME BUFFER COMPRESSION FOR VIDEO PROCESSING DEVICES

(75) Inventors: Stéphane Mallat, Paris (FR); Christophe Bernard, Paris (FR)

(73) Assignee: Zoran (France) S.A., Neuilly-sur-Seine (FR)

( * ) Notice: Subject to any disclaimer, the term of this patent is extended or adjusted under 35 U.S.C. 154(b) by 458 days.

This patent is subject to a terminal disclaimer.

(21) Appl. No.: 12/738,067

(22) PCT Filed: Oct. 26, 2007

(86) PCT No.: PCT/IB2007/055379
§ 371 (c)(1),
(2), (4) Date: Apr. 14, 2010

(87) PCT Pub. No.: WO2009/053780
PCT Pub. Date: Apr. 30, 2009

(65) Prior Publication Data
US 2010/0220783 A1    Sep. 2, 2010

(51) Int. Cl.
*H04N 7/26* (2006.01)
*G06K 9/36* (2006.01)
*H04N 7/50* (2006.01)

(52) U.S. Cl.
CPC ..................................... *H04N 7/50* (2013.01)
USPC ..................................... 375/240; 375/E7.26

(58) Field of Classification Search
None
See application file for complete search history.

(56) References Cited

U.S. PATENT DOCUMENTS

| 6,785,423 | B1 * | 8/2004 | Joshi et al. ................. 382/235 |
| 7,315,651 | B2 * | 1/2008 | Sakuyama et al. ........... 382/232 |
| 2001/0036231 | A1 * | 11/2001 | Easwar et al. ........... 375/240.19 |
| 2005/0111740 | A1 * | 5/2005 | Sakuyama ................. 382/232 |
| 2006/0071825 | A1 * | 4/2006 | Demos ........................ 341/50 |
| 2006/0133675 | A1 | 6/2006 | Kuo |
| 2007/0110151 | A1 | 5/2007 | Yu et al. |
| 2011/0310974 | A1 * | 12/2011 | Shand ..................... 375/240.18 |

FOREIGN PATENT DOCUMENTS

| EP | 1 566 969 | * | 8/2005 |
| WO | 2006090334 A2 | | 8/2006 |

OTHER PUBLICATIONS

Shih et al, "Memory Reduction by Haar Wavelet Transform for MPEG Decoder", IEEE Transactions on Consumer Electronics, vol. 45, No. 3, Aug. 1, 1999, pp. 867=873.*
Buckley, JPEG 2000—A Practical Digital Preservation Standard, Xerox Research Center, Webster, New York, USA, Feb. 2008.*
Shih et al, "Memory Reduction by Haar Wavelet Transform for MPEG Decoder", IEEE TRans. on Consumer Electronics, vol. 45, No. 3, Aug. 1, 1991, pp. 867-873.*

* cited by examiner

*Primary Examiner* — Jay Patel
*Assistant Examiner* — Reza Aghevli
(74) *Attorney, Agent, or Firm* — Lando & Anastasi, LLP (57) ABSTRACT

For compressing a video signal, a local multiscale transform is applied to a frame of the video signal to obtain coefficient blocks. The coefficients of each block are distributed into a plurality of coefficient groups, and for at least one of the groups, a common exponent is determined for encoding the coefficients of the group, and respective mantissas are determined for quantizing the coefficients of the group in combination with the common exponent. Coding data including each exponent determined for a coefficient group and the mantissas quantizing the coefficients of the group in combination with this exponent are stored in an external frame buffer.

14 Claims, 7 Drawing Sheets

FRAME BUFFER COMPRESSION FOR VIDEO PROCESSING DEVICES

CROSS-REFERENCE TO RELATED APPLICATIONS

This application is a National Stage application under 35 U.S.C. §371 of International Application PCT/IB2007/055379, filed on Oct. 26, 2007 and titled "FRAME BUFFER COMPRESSION FOR VIDEO PROCESSING DEVICES."

BACKGROUND OF THE INVENTION

The present invention relates to video processing and in particular to real-time video processing in dedicated hardware devices.

In the design of such dedicated hardware video processing devices, it is generally desired to reduce the need for external memory components, and for internal memory.

In a video processing device embodied as an application-specific integrated circuit (ASIC) or a field-programmable gate array (FPGA), input frames are stored in a frame buffer usually located in external memory, because they do not fit in the device itself. For processing, several frames are loaded line by line to be stored in an internal memory of the device, called line buffer.

Figure 1:
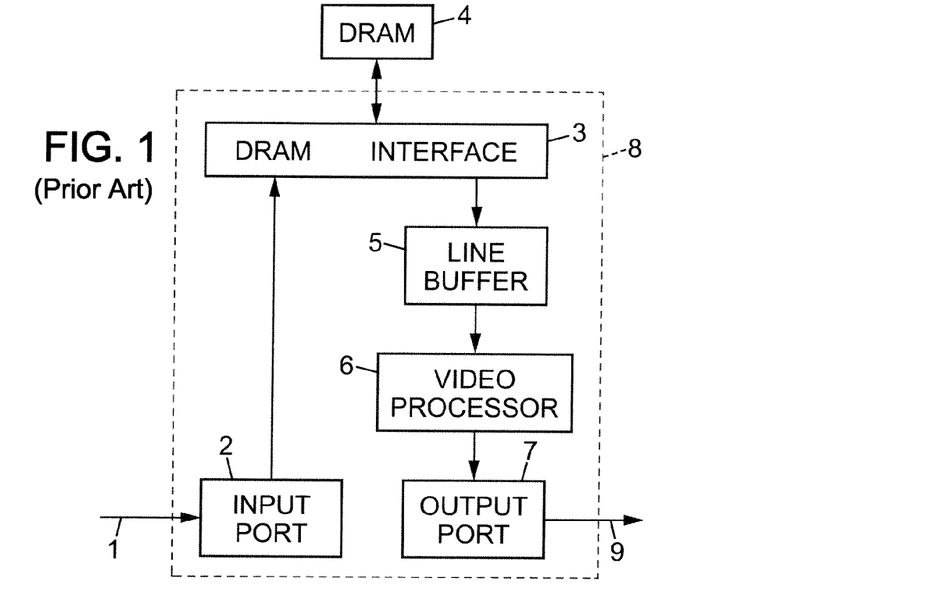
FIGS. 1-3, discussed above, are block diagrams of conventional video processing devices.

FIG. 1 shows the typical data flow and storage involved in a conventional video processing device 8. The input pixels 1 received at an input port 2 are stored into a frame buffer 4, usually implemented as one or more dynamic random access memory (DRAM) chips, via a DRAM interface 3. Then, the video processor 6 fetches lines from the DRAM 4 through the DRAM interface 3, storing them temporarily in the line buffer 5. The output 9 of processor 6 is fed to the output port 7 to be transmitted to the next device to which the video processing device 8 is connected. All image transfers are done in raster order, i.e. each frame full line by full line, and each line of a frame pixel by pixel from left to right.

In such a device 8, using an external DRAM 4 is required if the video processor 6 needs to process simultaneously pixels originating from different frames. This is necessary, for example, in applications such as deinterlacing, frame rate conversion, and overdrive processing in LCD timing controllers.

If the video processor 6 also needs to have access to pixels of different lines at the same time, a line buffer 5 of substantial size needs to be present inside the device 8. Important design parameters include the size of the DRAM 4, the available bandwidth between the device 8 and the DRAM chip(s) 4, and the size of the line buffer 5.

Considering input video frames of Y lines of X pixels each, with an input frame rate of F, the input pixel rate is X×Y×F not taking into account blanking. Typical values are X=1920, Y=1080 and F=50 or 60 FPS (frames per second). Similar parameters X', Y' and F' describe the output frame size and frame rate. In order to output one pixel, the video processor 6 needs to have simultaneous access to a context of C lines of the input video frames, for N different video frames. The DRAM 4 must then be able to store at least N frames of video, i.e. a total of X×Y×N pixels. At the DRAM interface, the pixel rate is X×Y×F pixels per second for writing and X×Y×N×F' pixels per second for reading. Typical data rates are then 1 billion pixels per second, which amounts to 30 Gb/s if a pixel is represented in RGB with 10 bits per channel. High transfer rates between the device 8 and the DRAM 4 are not desirable because they may require using a higher number of DRAM chips in parallel. The video processing device (in the case of an ASIC) then needs to have a large number of pins to access all the DRAM chips.

The required size of the internal video buffer 5 is X×C×N pixels. Hosting such a large line buffer in an ASIC is expensive, because it increases the die size of the ASIC, and has a negative impact on the manufacturing yield. It is thus desirable to limit as much as possible the size of the line buffer.

Figure 2:
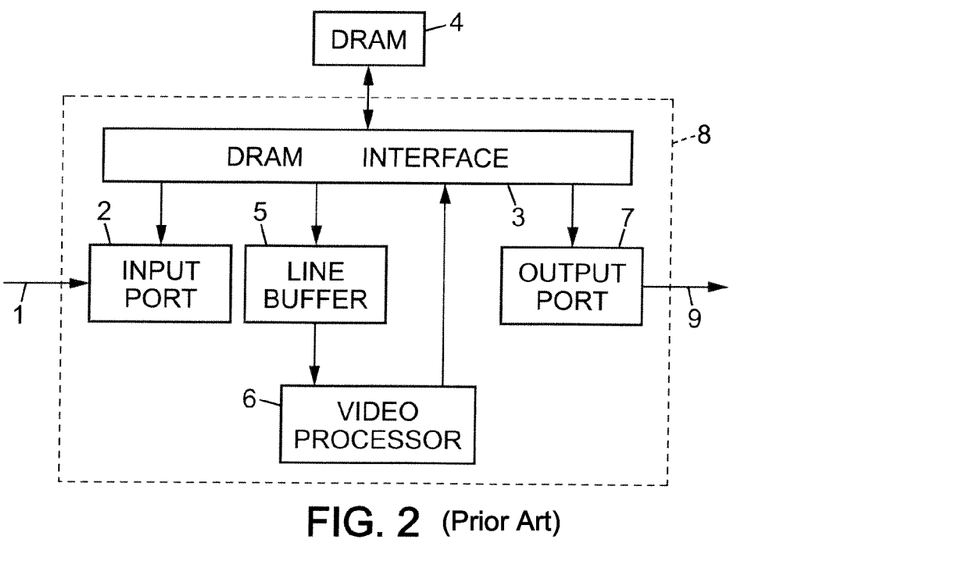

One way of reducing the size of the internal line buffer is to perform sequential processing by splitting the images into tiles, instead of working on full frames in raster order. This is illustrated in FIG. 2. The input video frames 1 are written into DRAM 4 via the input port 2 and the DRAM interface 3 like in FIG. 1. However, the lines of the frames are not read in their entirety at once. Instead, the frames are split horizontally into smaller vertical windows, or tiles, and the tiles are processed in succession. The gain is that the lines of the line buffer 5 have a length smaller than the full width of the video frame, corresponding to the width of the tiles. The overall size of the line buffer 5 can then be reduced in proportion. The downside is that the tiles must overlap so that the output tiles can be merged without any boundary artifact between the tiles. This causes in increase in the data rate in proportion to the overlapping factor, which can be of 20-30%. This proportion increases with the number of tiles. In addition, the output of the video processor 6 cannot be directly sent to the output port 7 because it is not in the raster order, but rather in the order of the tiles. A reordering of the pixels is necessary, and this requires an additional transit via the DRAM 4 between the video processor 6 and the output port 7. This can also increase substantially the required bandwidth at the DRAM interface. The solution illustrated by FIG. 2 allows trading a reduction of the internal memory required by line buffers 5 with an increase of bandwidth to the external memory 4.

Figure 3:
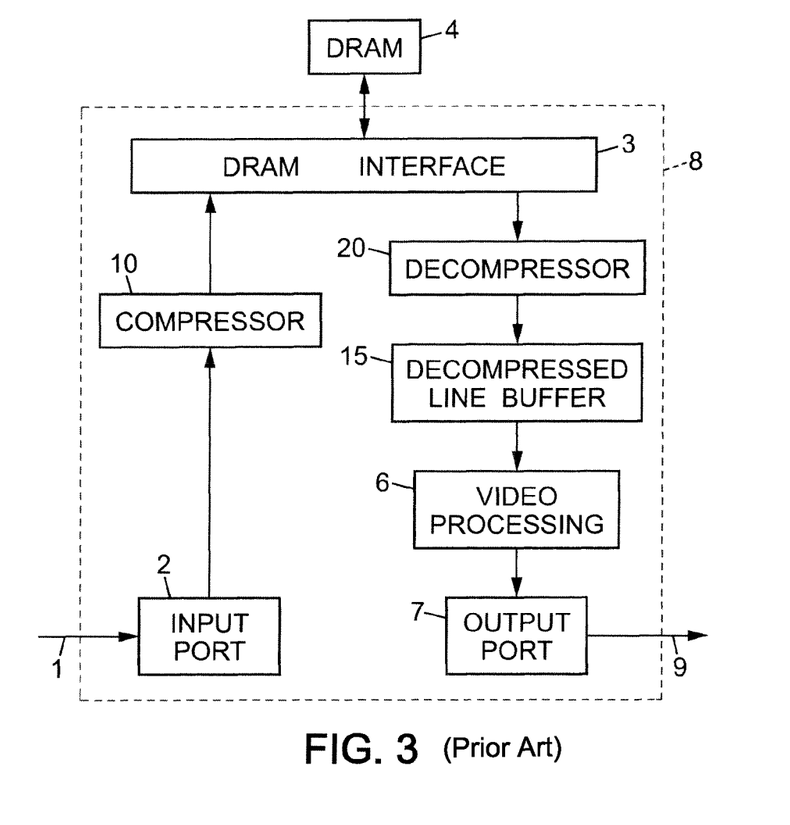

Compression techniques are another way of reducing both the required size of the internal memory and the bandwidth to the external DRAM chip(s). One way of using compression to this end is illustrated in FIG. 3. Between the input port 2 and the DRAM interface 3, an encoder 10 compresses the input pixel sequence for storage into DRAM 4. For operating the video processor 6, a decoder 20 receives the compressed pixel data read from DRAM 4 to restore decompressed pixel lines written into the decompressed line buffer 15 which may contain several adjacent lines forming a stripe. The video processor 6 reads pixel values from the decompressed line buffer 15, and delivers outputs pixels 9 via the output port 7.

The bandwidth to or from the external DRAM chip(s) is divided by the compression factor provided by the compression. The number/size of external DRAM chip(s) can be reduced in the same factor. Applying compression in such a context is disclosed in US 2007/0110151 A1, where a differential pulse code modulation (DPCM) scheme is used for compression.

In certain known compression techniques, the RGB pixels are converted to a YUV color space, and the color channels U are V and low-pass filtered and down-sampled by a factor of 2 horizontally. The frame is then stored in what is commonly called YUV 422 format. Other color sub-sampling schemes exist, like YUV 420 or YUV 411. See, e.g., WO 2006/090334. Recovering the RGB pixels requires to first up-sample again the U and V color planes, and to do the color space conversion from YUV back to RGB. In this way, the color information is simply down-sampled. For certain kinds of contents, such as video games, reducing the color resolution is a visible artifact. Such compression schemes allow compression factors of 1.5:1, or 2:1 in the very best case.

More efficient compression schemes such as JPEG or JPEG-2000 are widely known. They offer a visual quality close to lossless with compression factor of 3 to 5. They are not adapted though, because in most cases random access to an image region is not possible without decompressing the entire image. Also, it is desirable that the frame buffer compression process provides a constant bit rate (CBR) reduction factor in order to ensure that the peak bit rate for transmitting the frame buffers at a constant pixel rate is controlled.

There is a need for a new way of dealing with frame and line buffer constraints in video processing devices. There is also a need for a compression scheme usable in such a context, which provides a good tradeoff between compression ratio and image quality, while satisfying a CBR constraint with a fine granularity.

SUMMARY OF THE INVENTION

A method of compressing a video signal is proposed, comprising:
  applying a local multiscale transform to a frame of the video signal to obtain coefficient blocks;
  distributing the coefficients of each block into a plurality of coefficient groups;
  for at least one of said groups:
    determining a common exponent for encoding the coefficients of said group; and
    determining respective mantissas for quantizing the coefficients of said group in combination with the common exponent;
  storing coding data including each exponent determined for a coefficient group and the mantissas quantizing coefficients of said group in combination with said exponent.

The image coefficients are grouped into relatively small blocks of coefficients (e.g. 4×4 or 8×8 coefficients) that are each represented with the same number of bits. A coefficient block corresponds to a small region of the frame (e.g. 4×4 or 8×8 pixels). This allows performing a direct memory access to a compressed frame buffer with minimal overhead.

Groups of multiscale (e.g. wavelet) coefficients are represented with a global exponent, shared with all coefficients within the group, and individual signed mantissas. The multiscale coefficients can generally be positive or negative. The mantissas determined for each coefficient can be seen as positive numbers, in which case there are associated with a sign bit, or as signed numbers. Using an exponent, a sign and a mantissa for a single coefficient is the basic principle of all floating point representations of numbers in computers.

The compression method affords selective access to the frame data in a scalable way. Low-definition information can be accessed separately at low cost, and when high-definition information becomes necessary, additional and larger information can be loaded from the frame buffer off a separate layer to refine the coarse scale pixel information. This is an advantage provided by using a local multiscale transform such as a wavelet transform in the compression method.

Each coefficient group will generally contain coefficients corresponding to a common scale of the local multiscale transform. A particular case is the low-pass coefficient (highest scale of the transform) that will typically not be quantized in a mantissa-exponent representation, but copied uncompressed in the stored coding data. For scalable access to the coding data, it is convenient that the amount of coding data stored for one coefficient group of a block is the same for all groups corresponding to a given scale of the local multiscale transform.

As a complement to the above compression method, there is provided a method of decompressing a video signal from coding data, wherein, for a frame of the video signal, the coding data include block data for respective coefficient blocks corresponding to respective regions of the frame in a local multiscale transform. Each block comprises a plurality of coefficient groups. The block data for each coefficient block include exponents respectively associated with some of the coefficient groups of said block and mantissas respectively associated with the coefficients of said some of the groups. The method comprises:
  reading at least part of the block data for at least one coefficient block, the read block data including the exponent associated with at least one coefficient group selected among the groups of said block and the mantissas respectively associated with the coefficients of each selected group;
  recovering approximated values of the coefficients of each selected group by combining the mantissas respectively associated with said coefficients and the exponent associated with said selected group;
  assembling at least partially said coefficient block using the approximated coefficient values; and
  applying a local inverse multiscale transform to the assembled coefficient block.

In an embodiment, the step of reading the block data for said coefficient block comprises selecting said at least one coefficient group based on a target definition for the decompressed signal of the frame.

Other aspects of the invention relate to an encoder and a decoder arranged for implementing the above compression and decompression methods. Such encoder and decoder can in particular have application in video processing devices.

Such a video processing device according to the invention comprises:
  an encoder for compressing a video signal in the form of coding data for successive frames of the video signal,
  a memory interface for storing the coding data in an external memory and retrieving coding data from the external memory;
  a decoder for converting retrieved coding data into a decompressed signal; and
  a video processor for processing the decompressed signal.

The encoder comprises:
  a transforming unit for applying a local multiscale transform to a frame of the video signal to obtain coefficient blocks;
  a mapping unit for distributing the coefficients of each block into a plurality of coefficient groups; and
  a coding data generator for generating coding data including, for at least one of said groups:
    a common exponent for encoding the coefficients of said group; and
    respective mantissas for quantizing the coefficients of said group in combination with the common exponent.

The decoder comprises:
  an extraction unit for extracting the coding data for at least one coefficient group selected among the groups of the coefficient block;
  a computation unit for combining the mantissas forming part of the coding data for each selected group and the exponent forming part of the coding data for said selected group to obtain approximated values of the coefficients of said selected group;

an assembling unit for assembling at least partially said coefficient block using the approximated coefficient values; and a transforming unit for applying a local inverse multiscale transform to the assembled coefficient block.

When the compressed video signal is available according to luma and chroma channels (initially or after a change of color coordinate system), the coding data generated from the signal component of the luma channel can be allocated more bits than the coding data generated from the signal component of each chroma channel. This makes it possible to optimize the compression ratio while keeping a good quality of the signal.

In order to easily access the coding data, it is convenient if the amount of coding data stored in the external memory for the groups of a coefficient block is the same for all coefficient blocks obtained from a component (e.g. one RGB color, or a luma or chroma channel) of the video signal.

Each coefficient group may be assigned a respective mantissa depth parameter corresponding to a number of bits representing each mantissa forming part of the coding data for said group. The common exponent for said group is then determined based on the values of the coefficients of said group and on said mantissa depth parameter. Each coefficient group for which coding data including an exponent and mantissas are generated will typically be made up of coefficients resulting from the local multiscale transform at a same scale n, with $1 \leq n \leq N$, N being the number of scales of the multiscale transform. The mantissa depth parameter is preferably a decreasing function of the scale index n, which optimizes the compression ratio since the fine-scale coefficients, i.e. with n small, are more numerous and perceptually less important than the coarse-scale coefficients.

An embodiment of the video processing device further comprises a decompressed line buffer for storing the decompressed signal along a stripe of consecutive lines of at least one frame. The video processor is then arranged to read the decompressed signal from the line buffer.

Alternatively, the video processing device comprises a compressed line buffer for storing coding data transferred from the external memory for a plurality of regions of a frame spanning a stripe of lines of said frame, and a context buffer for storing the decompressed signal in a context portion of said frame, the context portion being included in said stripe of lines and offset according to a pixel location addressed by the video processor. The video processor is then arranged to read the decompressed signal from the context buffer.

It may be observed that the latter embodiment may be used with various compression schemes other than the one discussed above. Accordingly, another aspect of the invention relates to a video processing device, comprising:

an encoder for compressing a video signal in the form of coding data for successive frames of the video signal;

a memory interface for storing the coding data in an external memory and retrieving coding data from the external memory;

a compressed line buffer for storing coding data transferred from the external memory for a plurality of regions of a frame spanning a stripe of lines of said frame;

a decoder for converting coding data read in the compressed line buffer into a decompressed signal;

a video processor for processing the decompressed signal; and a context buffer for storing the decompressed signal of a context portion of said frame, the context portion being included in said stripe of lines and offset according to a pixel location addressed by the video processor.

Such an embodiment makes it possible for the compression to reduce not only the size of the external frame buffer but also that of the internal line buffer of the device. Only a small context portion needs to be stored explicitly in the decompressed form.

The decoder may be arranged to update the content of the context buffer as the video processor proceeds along a line of pixels of a frame. To do so, it deletes at least one column of pixels on one side of the context portion and adds, on the opposite side of the context portion, at least one other column of decompressed pixels obtained based on coding data retrieved from the compressed line buffer for selected regions covering said other column of decompressed pixels.

When the coding data represent coefficients of a local multiscale transform, the compressed line buffer may have a first layer for receiving coding data representing first coefficients of at least one first scale for said plurality of regions spanning the stripe of lines, and at least one second layer for receiving coding data representing second coefficients of at least one second scale finer than said first scale for some of the regions of said plurality of regions spanning a narrower stripe of the frame. The decoder is then arranged to generate the decompressed signal of the context portion by extracting coding data from both the first and second layers of the compressed line buffer.

DESCRIPTION OF PREFERRED EMBODIMENTS

Figure 4:
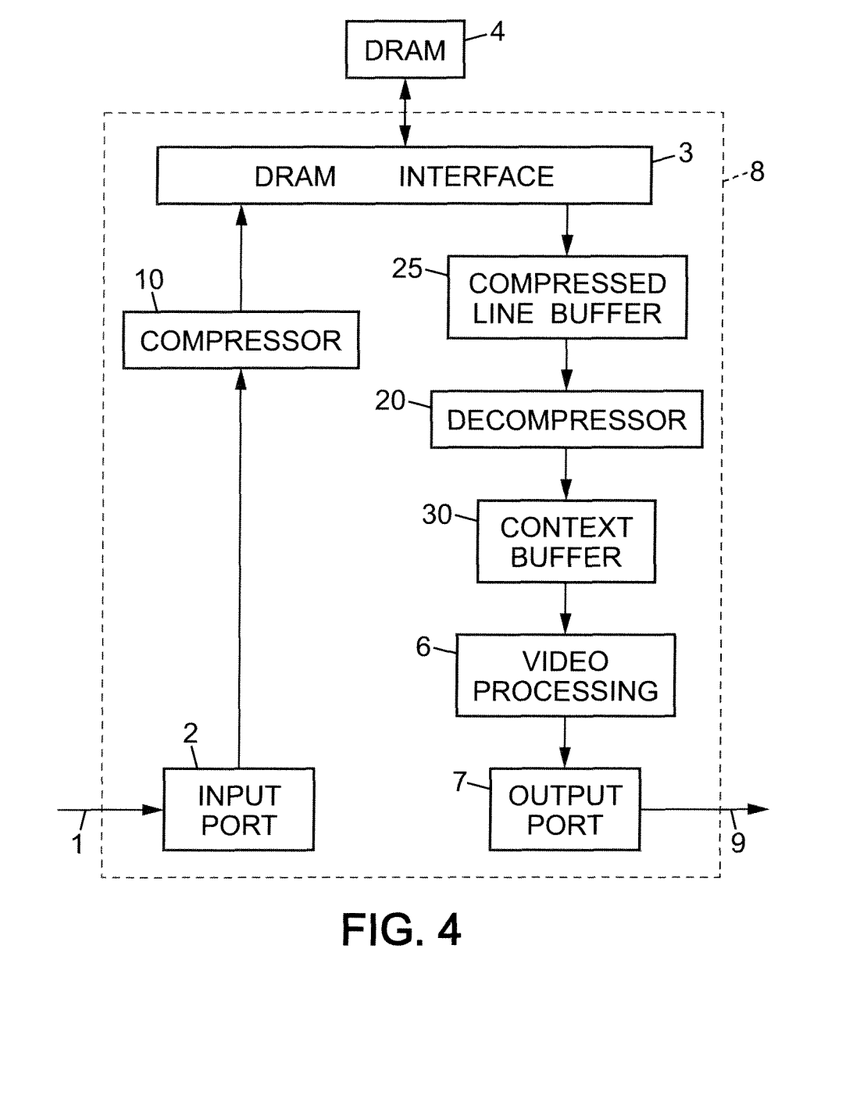
FIG. 4 is a block diagram of a video processing device according to an embodiment of the invention.

Compression can be used for reducing the need for internal memory inside a video processing device 8 as discussed in the introduction. This is illustrated in FIG. 4. The line information is transferred in a compressed form from the DRAM 4 to be stored into a compressed line buffer 25 whose size, compared to the decompressed line buffer 15 of FIG. 3, is reduced by the compression factor. The decoder 20 decompresses on-the-fly pixels from the line buffer 25 to store decompressed pixels in a small-sized context buffer 30.

Figure 5:
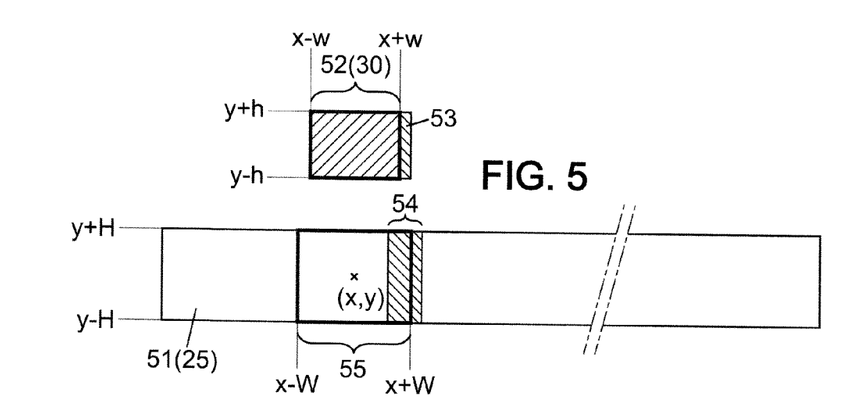
FIG. 5 is a diagram illustrating a way of organizing line and context buffers in an embodiment of the invention.

On-the-fly decompression of the context portion is performed as the video processor 6 is proceeding along a line of the current output frame. FIG. 5 illustrates the operation of decoder 20 in the video processing device 8 of FIG. 4. The compressed line buffer 25 contains coding data corresponding to a horizontal stripe 51 of pixels. As an example, the uncompressed pixels are each made of 30 bits in RGB representation and the compression factor is 2:1, so that the number of bits per pixel in the compressed state is 15.

The video processor 6 runs along the pixel frames in raster order. At a given point, it is processing a pixel of coordinates (x, y). Stripe 51 covers pixels useful for processing all pixels of coordinates (x', y) where x' covers the width of the image. When processing pixel (x, y), the video processor 6 needs access to a context of decompressed pixels 52. In the example considered here, the context portion is a rectangle [x−w; x+w]×[y−h; y+h], where w and h are the half-width and the half-height of the context. The decompressed pixels of the context portion 52 are maintained in a separate storage area, namely the context buffer 30. The decompressed pixel context is much narrower than the full line buffer. It is computed from a corresponding compressed context 55 which is part of the stripe 51 stored in the line buffer 25. In the example, the context of compressed pixels 55 is a rectangle [x−W; x+W]×[y−H; y+H], with W≥w and H≥h. So the height of stripe 51 must be sufficient to include 2H lines. When turning to the next pixel to be processed, at (x+1, y), the context of decompressed pixels 52 is updated as follows: the leftmost column is dropped, and an additional column 53 of new decompressed pixels is computed at added as the new rightmost column of the context portion. This column of pixels 53 can be derived from a small set of compressed pixel coefficients located at 54 in the stripe 51 stored in line buffer 25. Depending on the needs of the video processing architecture using the context of decompressed pixels 52, the shape of the context may differ from the above simple example. It may be not centered around the current pixel, but more generally offset in accordance with the pixel location x, y. For example it can be a rectangle [x−w; x+w']×[y−h; y+h']. It may be of non-rectangular shape, or even non-connected (e.g. several distinct rectangles). In the case of non-rectangular shapes, the context of decompressed pixels 52 may be updated by dropping one or more columns of pixels and adding also one or more columns of decompressed pixels. For simplicity of the description however, the simpler case of a centered rectangular context is exemplified in the drawings.

The device shown in FIG. 4 can make use of various compression schemes, for example the YUV 422, YUV 420 or YUV 411 schemes mentioned previously. It can also be used advantageously with the new compression/decompression scheme described below.

In the first step of the compression process, the encoder 10 applies a multiscale transform to the pixels of the current frame. In the following, this multiscale transform is a wavelet transform. A low-complexity transform such as a Haar or 5-3 Daubechies wavelet transform can in particular be used. The transform is performed with a predefined number of scales. The transform is assumed to map integers to integers and is performed in-place using lifting steps.

Through the multiscale wavelet transform, a correspondence is established between regions of a current frame and blocks of transform coefficients. In certain embodiments, the correspondence may be one-to-one between image regions and coefficient blocks, but this is not always the case.

Figure 10:
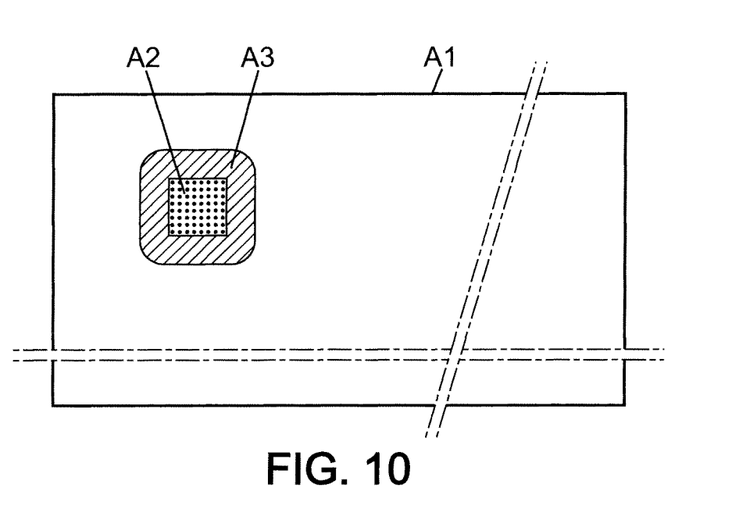
FIGS. 10 and 11 are diagrams illustrating the correspondence between pixel regions in a video frame and coefficient blocks resulting from an exemplary local multiscale transform.
Figure 11:
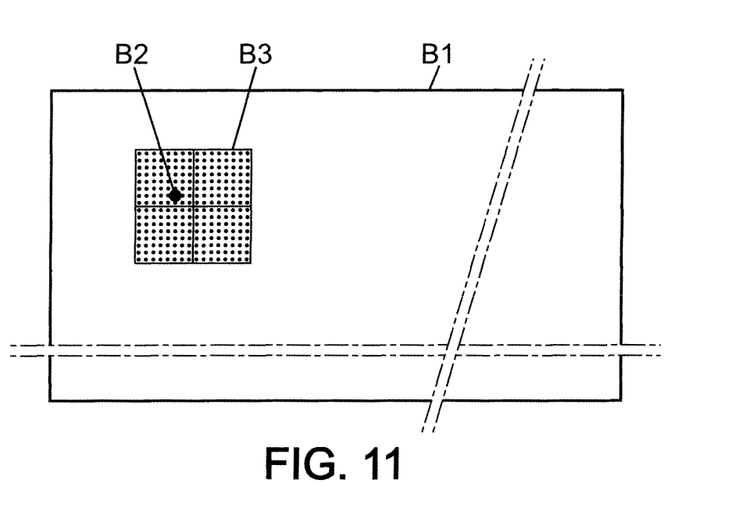

For example, in the above-mentioned case of a wavelet transform performed in-place, the correspondence may be as illustrated in FIGS. 10-11. In FIG. 10, A1 denotes an image made of pixels I[x, y] where the integer indices x and y are in the intervals 0≤x<X and 0≤y<Y. The transform is conventionally arranged so that the transform of the whole image contains the same number of coefficients as the number of pixels in the image, and that the transform coefficients are indexed in the same way. The transform coefficients C[x, y] are then defined for the same values of x and y. In addition, the transform is local in the sense that a block A2 of coefficients C[x, y] for $p \times 2^N \leq x < (p+1) \times 2^N$ and $q \times 2^N \leq y < (q+1) \times 2^N$ can be computed from pixels with the same indices, and pixels located in a vicinity depicted by the hatched area A3. In the illustrated example, N=3, the blocks being made of 8×8=64 coefficients. So in this case, coefficient block A2 corresponds to region A2∪A3 in the image.

FIG. 11 represents the array of transform coefficients B1, having the same size as the original image array. The inverse transform is also local, in the sense that, in order to compute a pixel value at x, y (depicted by the black dot B2), a limited number coefficient blocks located around this pixel (B3) are needed to perform the reconstruction of the pixel value. These blocks (B3) are those corresponding to the image regions including pixel B2.

Many video processing applications do not need a random access with a granularity of a single pixel, but of a cluster of pixels, or a cluster of pixels moving in raster order, reconstructed with a pipelined wavelet reconstruction, so that the apparently poor ratio (volume of data needed to reconstruct a single pixel value) is in practice much more favorable.

Figure 6:
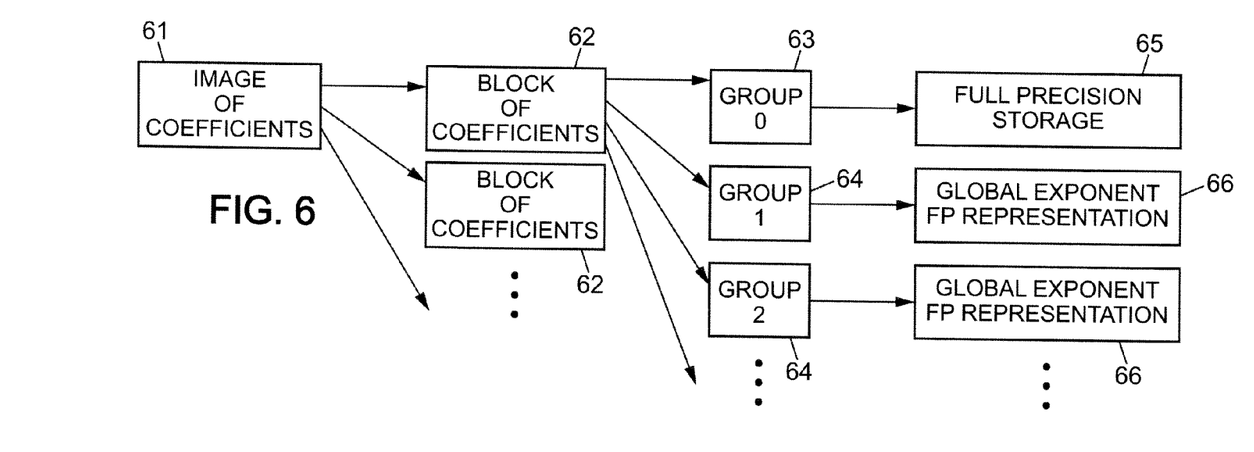
FIG. 6 is a diagram illustrating a way of distributing and representing multiscale image coefficients in an embodiment of the invention.

FIG. 6 illustrates a mapping scheme applied to the transform coefficients. The coefficients 61 resulting from the multiscale transform form an image that is split into several blocks of coefficients 62, each corresponding to a small region of the current frame. Each block of coefficients 62 is coded with a predefined number of bits as follows. A block of coefficients 62 is split into several groups of coefficients 63, 64, etc. Usually, all coefficients within a given group have the same nature (same type of coefficient, same dynamic range). For each block 62, a special group 63 is the one containing the low-pass coefficient of the multiscale transform. This low-pass coefficient is represented and stored with full precision 65. Each of the other groups of coefficients 64 is quantized at 66 with a so-called global exponent floating point (FP) representation.

Figure 7:
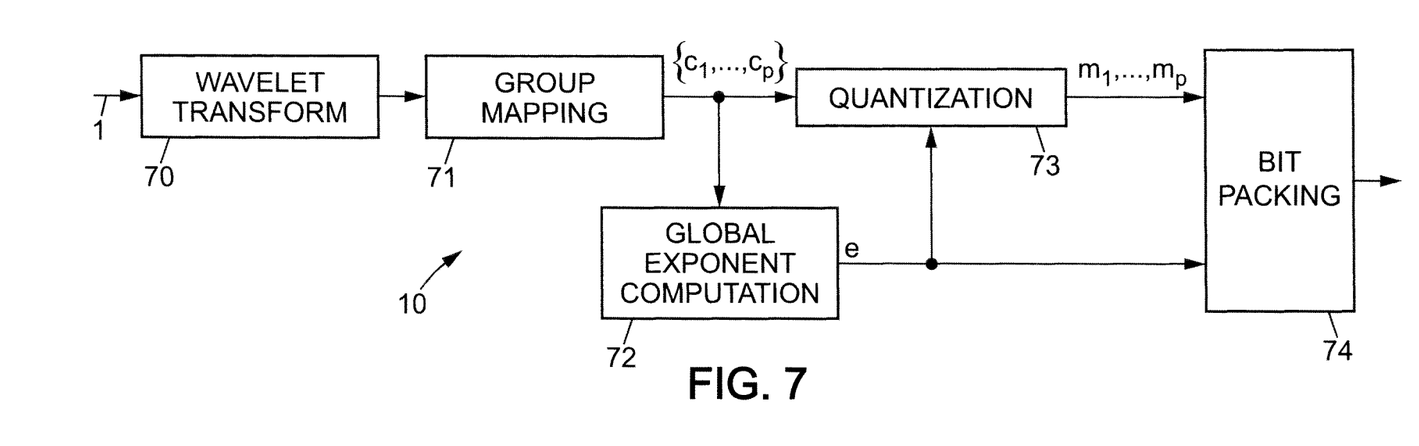
FIGS. 7 and 8 are block diagrams of exemplary encoder and decoder according to the invention.

A possible structure of the encoder 10 is illustrated in FIG. 7. The frames received from the input port 2 are provided to a transforming unit 70, in this case a wavelet transform unit, which processes them in the raster order to generate the multiscale coefficients mapped onto groups of coefficients by a unit 71 as outlined above.

For each group of coefficients $\{c_1, \ldots, c_p\}$, a global exponent representation is built. Namely each coefficient $c_i$ is approximated as:

$$c_i \approx 2^e \cdot m_i \qquad (1)$$

where e is an exponent common for all coefficients within the group, and the numbers $m_i$ designate respective mantissas for the coefficients $c_i$.

The operations of the coding data generator 72-74 are sequenced as follows. A module 72 computes a global exponent e from the input coefficients $\{c_1, \ldots, c_p\}$ of a group, as received from the mapping unit 71. Based on this global exponent e, an adaptive quantization is applied to the coefficients $c_1, \ldots, c_p$ by the quantization module 73 to compute the mantissas $m_1, \ldots, m_p$. These mantissas $m_1, \ldots, m_p$ and the exponent e are then assembled together in a bit packing unit 74 to produce a compressed data unit of predetermined size.

Figure 8:
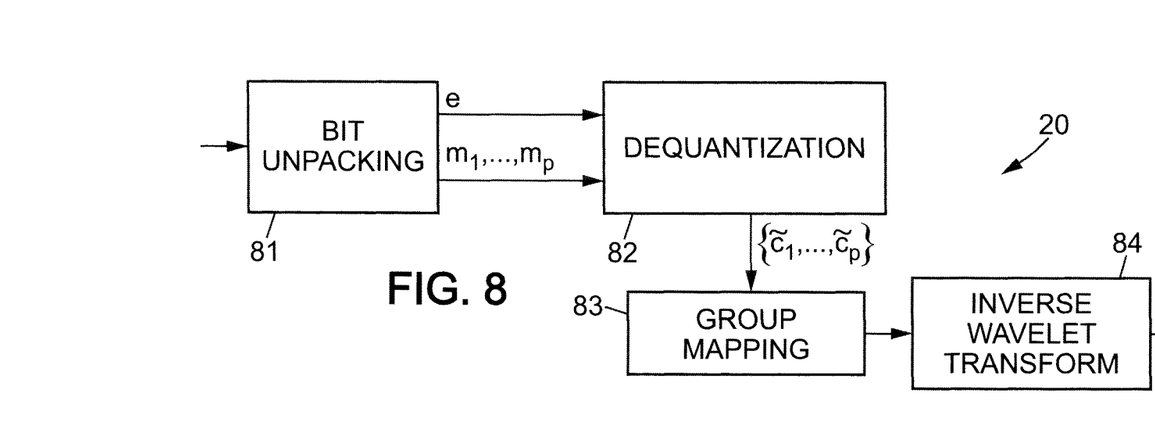

The structure of the corresponding decoder 20 is illustrated in FIG. 8. The compressed data units are extracted by a bit unpacking unit 81 which recovers the mantissas $m_1, \ldots, m_p$ and the exponent e for each group. These are used to "dequantize" reconstructed coefficients $\tilde{c}_i$ with a formula identical or similar to (1) in the computation unit 82. The reconstructed groups of coefficients $\{\tilde{c}_1, \ldots, \tilde{c}_p\}$ are assembled into reconstructed coefficient blocks and into images of reconstructed coefficients by the group mapping unit 83. The decompressed image portion is then computed by the transforming unit 84 by applying the inverse wavelet transform to the reconstructed coefficients.

A parameter of the compression scheme is the mantissa depth, i.e. the number of bits d on which the mantissas are represented. By way of example, d=4. The mantissa depth parameter is defined for each group of coefficients and it is normally the same for all groups made up of coefficients of a same scale.

In an exemplary embodiment, the exponent e for a group is computed by module 72 as follows. The absolute value of each coefficient $c_i$ of the group is written in binary form. Then a number e' is defined as the rank of the highest order non-zero bit in all absolute values $|c_i|$. The exponent e is then defined as e=e'−d+1. For instance, if d=4, and if the absolute values $|c_i|$ of the coefficients are 1101, 1000001 and 1000, the highest order non-zero bit is in the second coefficient and corresponds to $2^6$. Thus e'=6, and e=e'−d+1=3. The exponent value is then e=3.

Each coefficient $c_i$ of the group may then be represented in module 73 with a uniform quantizer of bin size $2^e$, with a 0-bin of size $2^{e+1}$, as is customary in wavelet-based compression: $m_i = \lfloor c_i/2^e \rfloor$ if $c_i > 0$ and $m_i = -\lfloor -c_i/2^e \rfloor$ else, where $\lfloor X \rfloor$ denotes the integer equal to or immediately below X. In this way, each mantissa $m_i$ is represented with a sign bit and an integer in the range $[0; 2^d-1]$, encoded on d=4 bits. This is done with straightforward binary operations by keeping the bits of rank e, e+1, ..., e+d−1 in the positive representation of each $c_i$, plus a sign bit. The overall budget for storing p coefficients with a mantissa of depth d, and an exponent that can be represented on E bits is E+p.(1+d).

On the decoding side, the dequantization is done in unit 82 by replacing each number by the central value of its quantization bin. So if $m_i$ is 0, the decoded value $\tilde{c}_i$ is 0. Otherwise if $m_i > 0$, $\tilde{c}_i = 2^e.(m_i + ½)$, and if $m_i < 0$, then $\tilde{c}_i = 2^e.(m_i - ½)$.

Alternatively, the quantization model can be truly uniform instead of having a double 0-bin. A coefficient $c_i$ is represented by a number $2^e.m_i$, where $m_i = [c_i/2^e]$ with $[X]$ denoting the integer closest to X. In this case, the dequantization is simpler: $\tilde{c}_i = m_i.2^e$.

By way of example, the compression process uses an N-scale wavelet transform performed "in-place" with an integer lifting scheme. The coefficient image is split into blocks of $2^N \times 2^N$ coefficients each having the same structure. The coefficients inside a block are denoted c[i, j] where $0 \leq i < 2^N$ and $0 \leq j < 2^N$.

Figure 9:
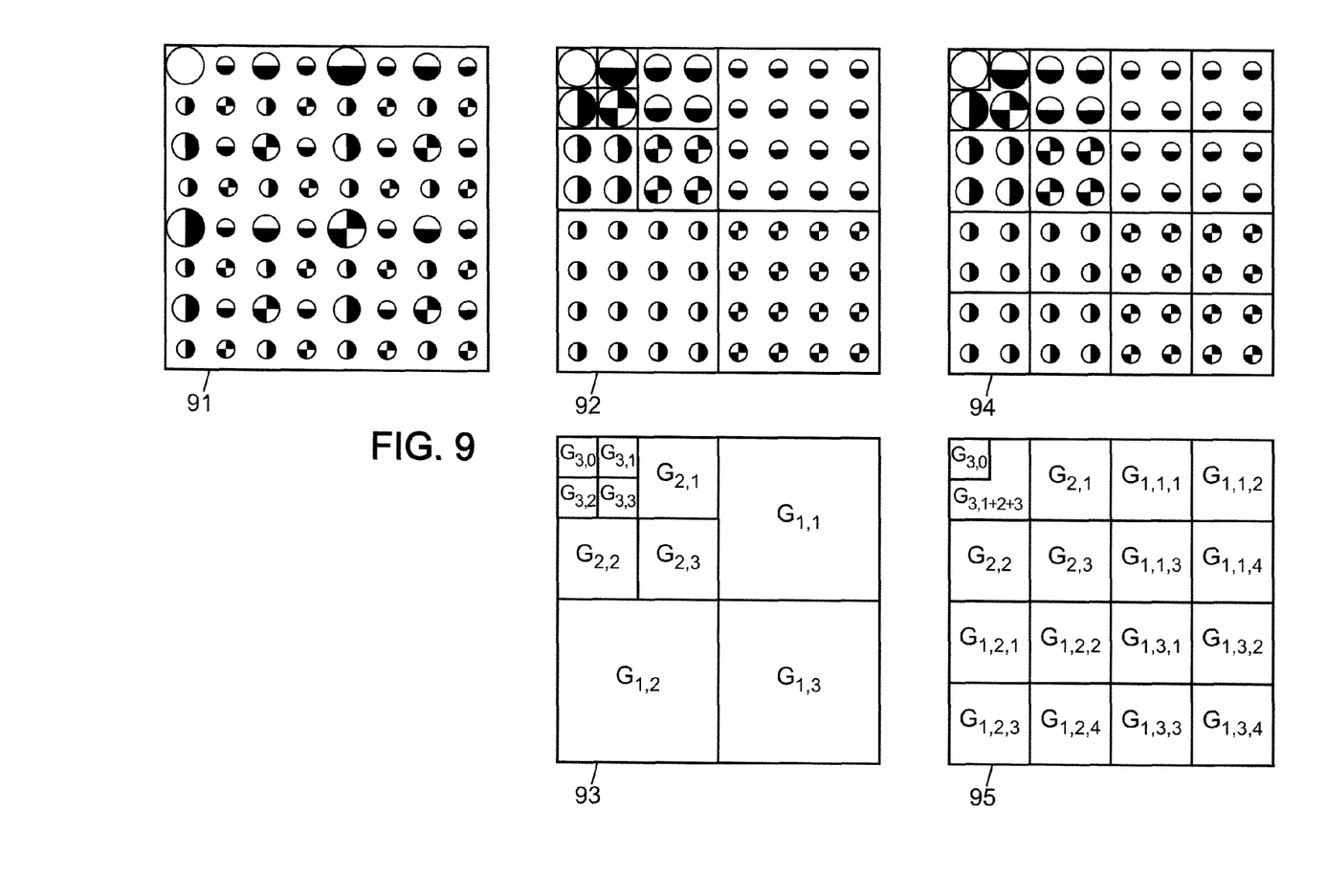
FIG. 9 shows diagrams illustrating the mapping of coefficients of a block onto coefficient groups in a specific example.

Diagram 91 in FIG. 9 illustrates how a block of these coefficients c[i, j] is arranged in the absence of reordering. The coefficients inside each block are then grouped by scale and orientation. In the particular case of the wavelet transform, the groups are the following:

a group $G_{N,0}$ consisting of one low-pass coefficient c[0, 0] at scale N;

for each scale n between 1 and N, a group $G_{n,1}$ of horizontal wavelet coefficients $c[2^n.i+2^{n-1}, 2^n.j]$ having $p=2^{2(N-n)}$ coefficients;

for each scale n between 1 and N, a group $G_{n,2}$ of vertical wavelet coefficients $c[2^n.i, 2^n.j+2^{n-1}]$, having $p=2^{2(N-n)}$ coefficients;

for each scale n between 1 and N, a group $G_{n,3}$ of diagonal wavelet coefficients $c[2^n.i+2^{n-1}, 2^n.j+2^{n-1}]$, having $p=2^{2(N-n)}$ coefficients.

The corresponding groups of coefficients are displayed in diagram 92 of FIG. 9, and the names of the groups are written in diagram 93.

As illustrated in FIG. 9 for N=3, the groups are advantageously reorganized to have more homogeneous sizes. For example, groups $G_{N,1}$, $G_{N,2}$ and $G_{N,3}$ all have a single coefficient, and are reorganized as one group $G_{N,1+2+3} = G_{N,1} \cup G_{N,2} \cup G_{N,3}$. Conversely, groups $G_{n,k}$ for smaller n can have 16 or 64 coefficients, and can be split into smaller groups of 2×2 or 4×4 coefficients. Diagrams 94 and 95 in FIG. 9 shows how the coefficients are grouped in the case where N=3:

groups $G_{3,1}$, $G_{3,2}$ and $G_{3,3}$ are grouped together into $G_{3,1+2+3} = G_{3,1} \cup G_{3,2} \cup G_{3,3}$;

groups $G_{1,1}$, $G_{1,2}$, and $G_{1,3}$ are each split into four smaller groups, i.e. $G_{1,1}$ is split into $G_{1,1,1}$, $G_{1,1,2}$, $G_{1,1,3}$ and $G_{1,1,4}$, etc.

In this example, the coefficients can be encoded with the bit budget shown in Table 1.

TABLE 1

Bit budget summary for a block of 8x8 coefficients, case 1.

| Group | Number | Size | Exponent | Mantissa (d) | Sign | Total |
|---|---|---|---|---|---|---|
| $G_{3,0}$ | 1 | 1 | | 13 | | 13 |
| $G_{3,1+2+3}$ | 1 | 3 | 4 | 4 | 1 | 19 |
| $G_{2,a}$ | 3 | 4 | 4 | 3 | 1 | 20/group |
| $G_{1,a,b}$ | 12 | 4 | 4 | 2 | 1 | 16/group |
| TOTAL | | 64 | | 157 | 63 | 284/block |

The mantissa budgets are 4 bits for coarse-scale coefficients, 3 bits for scale 2 coefficients, and 2 bits for the scale 1 coefficients. The compressed bit rate is 284/64=4.44 bits per pixel, i.e. a compression factor of 2.25:1 assuming a source data rate of 10 bits per pixel.

A lower budget compression could use fewer bits for the mantissas: 3 bits at scale 3, 2 bits at scale 2 and 1 bit at scale 1, leading to the breakdown shown in Table 2.

TABLE 2

Bit budget for a group of 8x8 coefficients, case 2.

| Group | Number | Size | Exponent | Mantissa (d) | Sign | Total |
|---|---|---|---|---|---|---|
| $G_{3,0}$ | 1 | 1 | | 13 | | 13 |
| $G_{3,1+2+3}$ | 1 | 3 | 4 | 3 | 1 | 16 |
| $G_{2,a}$ | 3 | 4 | 4 | 2 | 1 | 16/group |
| $G_{1,a,b}$ | 12 | 4 | 4 | 1 | 1 | 12/group |
| TOTAL | | 64 | | 94 | 63 | 221/block |

In this case, the compressed bit rate is 221/64=3.45 bits per pixel. The compression factor is 2.90:1.

The compression scheme has applications for reducing the volume of data to be stored in external frame stores, thus reducing (1) the size requirement of the external DRAM chips(s) 4 and (2) the bandwidth requirement to this external DRAM storage. For example, the encoder 10 and decoder 20 can be incorporated in a video processing device 8 having the architecture depicted in FIG. 3, with a decompressed line buffer 15 containing a stripe of decompressed pixels accessed by the video processor 6.

Furthermore, the volume of data to be stored in internal line buffers can also be reduced, thus reducing the requirement on the size and silicon surface of the internal line buffer. In this case, the video processing device 8 may have the architecture depicted in FIG. 4, with a compressed line buffer 25 containing coding data for a stripe of pixels and a small-sized decompressed context buffer 35 fed by the decoder 20 and read by the video processor 6.

When handling color images, an embodiment converts the image in luma and chroma channels (e.g. Y, Cb and Cr), and encodes each channel separately. The separate encoding can be performed with different encoding parameters (for example the number of bits allocated to the mantissa for a same kind of coefficient). As an illustration, the luma channel (Y) can be encoded according to Table 1, and the chroma channels (Cb and Cr) according to Table 2. The resulting bit budget is less than 12 bits per pixel, instead of the original 30 bits per pixel.

In another embodiment, the video processor 6, when working at location x, y and at time t does not require fine scale information inside the line buffer at all vertical offsets. For example, fine scale information is required for a total of 41 lines, from y−20 to y+20, and coarse scale information only is required on 20 additional lines y+21, . . . , y+40 above said 41 lines, and also on 20 additional lines y−40, . . . , y−21 below said 41 lines.

In order to take advantage of this, the compressed line buffer 25 can be split into two or more layers. For example, a coarse scale layer contains only coefficients of scale 2 or more (groups $G_{3,0}$, $G_{3,1+2+3}$, $G_{2,a}$ in the example of diagram 95 in FIG. 9), and an additional refinement layer contains coefficients of scale 1 (groups $G_{1,a,b}$ in FIG. 9). The compressed line buffer 25 then only needs to store refinement layer coefficients for 40 lines instead of 80, which provides a substantial gain in internal memory. As a consequence, the coefficients of the refinement layer are loaded into the compressed line buffer later than the coarse scale layer, and discarded earlier, and take up less space in the compressed line buffer.

Again, the coarse scale context lines may not be placed symmetrically above and below the fine scale context (e.g. 20 lines above and 40 lines below the 41 lines). The coarse scale context and the fine scale context may be non-symmetric, no-rectangular and even non-connected.

In another embodiment, the video processor 6 does not require the luma and chroma information at the same processing stage, i.e. not within the same context. Again, this makes it possible to store the chroma channels in the compressed line buffer on less lines than, e.g., the luma channel, to load the chroma information later into the compressed line buffer, and to discard this information earlier than the luma information.

While a detailed description of exemplary embodiments of the invention has been given above, various alternative, modifications, and equivalents will be apparent to those skilled in the art. Therefore the above description should not be taken as limiting the scope of the invention which is defined by the appended claims.

The invention claimed is:

1. A video processing device, comprising:
   an encoder for compressing a video signal in the form of coding data for successive frames of the video signal;
   a memory interface for storing the coding data in an external memory and retrieving coding data from the external memory;
   a decoder for converting retrieved coding data into a decompressed signal; and
   a video processor for processing the decompressed signal, wherein the encoder comprises:
      a transforming unit for applying a multiscale transform to a frame of the video signal to obtain coefficient blocks;
      a mapping unit for distributing the coefficients of each block into a plurality of coefficient groups; and
      a coding data generator for generating coding data including, for at least one of said groups:
         a common exponent for encoding the coefficients of said group; and
         respective mantissas for quantizing the coefficients of said group in combination with the common exponent,
   and wherein the decoder comprises:
      an extraction unit for extracting the coding data for at least one coefficient group selected among the groups of a coefficient block;
      a computation unit for combining the mantissas forming part of the coding data for each selected group and the exponent forming part of the coding data for said selected group to obtain approximated values of the coefficients of said selected group;
      an assembling unit for assembling at least partially said coefficient block using the approximated coefficient values; and
      a transforming unit for applying an inverse multiscale transform to the assembled coefficient block;
   wherein the device further comprises a line buffer for storing coding data transferred from the external memory for a plurality of regions of a frame spanning a stripe of lines of said frame; and
   a context buffer for storing the decompressed signal in a context portion of said frame, the context portion being included in said stripe of lines and offset according to a pixel location addressed by the video processor;
   wherein the video processor is arranged to read the decompressed signal from the context buffer.

2. The device as claimed in claim 1, wherein each coefficient group is made up of coefficients resulting from the multiscale transform at a same scale.

3. The device as claimed in claim 2, wherein the amount of coding data stored for one coefficient group of a block is the same for all groups corresponding to a given scale of the multiscale transform.

4. The device as claimed in claim 3, wherein said at least one coefficient group is selected based on a target definition for processing the decompressed signal.

5. The device as claimed in claim 1, wherein the block data for each coefficient block further include a low-pass coefficient assembled with the approximated coefficient values to obtain the assembled coefficient block for the inverse multiscale transform.

6. The device as claimed in claim 1, wherein the decoder is arranged to update the content of the context buffer as the video processor proceeds along a line of pixels of a frame, by deleting at least one column of pixels on one side of the context portion and adding, on an opposite side of the context portion, at least one other column of decompressed pixels obtained by the decoder based on coding data retrieved from the line buffer for selected regions covering said other column of decompressed pixels.

7. The device as claimed in claim 1, wherein the line buffer has a first layer for receiving coding data pertaining to first coefficient groups made up of coefficients resulting from the multiscale transform at at least one first scale for said plurality of regions spanning the stripe of lines, and a second layer for receiving coding data pertaining to second coefficient groups made up of coefficients resulting from the multiscale transform at at least one second scale finer than said first scale for some of the regions of said plurality of regions spanning a narrower stripe of the frame, and wherein the decoder is arranged to generate the decompressed signal of the context portion by extracting coding data from both the first and second layers of the line buffer.

8. The device as claimed in claim 1, wherein the compressed video signal corresponds to luma and chroma channels, and wherein the coding data generated from the signal component of the luma channel are allocated more bits than the coding data generated from the signal component of each chroma channel.

9. The device as claimed in claim 1, wherein the amount of coding data stored in the external memory for the groups of a coefficient block is the same for all coefficient blocks obtained from a component of the video signal.

10. The device as claimed in claim 1, wherein each coefficient group has a respective mantissa depth parameter assigned thereto, corresponding to a number of bits representing each mantissa forming part of the coding data for said group, and wherein the common exponent for said group is determined based on the values of the coefficients of said group and on said mantissa depth parameter.

11. The device as claimed in claim 10, wherein each coefficient group for which coding data including an exponent and mantissas are generated is made up of coefficients resulting from the multiscale transform at a same scale n, n being an integer scale index between 1 and N and N being the number of scales of the multiscale transform, and wherein the mantissa depth parameter is a decreasing function of the scale index n.

12. A video processing device, comprising:
  an encoder for compressing a video signal in the form of coding data for successive frames of the video signal, the coding data representing coefficients of a wavelet transform;
  a memory interface for storing the coding data in an external memory and retrieving coding data from the external memory;
  a line buffer for storing coding data transferred from the external memory for a plurality of regions of a frame spanning a stripe of lines of said frame;
  a decoder for converting coding data read in the line buffer into a decompressed signal;
  a video processor for processing the decompressed signal; and
  a context buffer for storing the decompressed signal of a context portion of said frame, the context portion being included in said stripe of lines and offset according to a pixel location addressed by the video processor.

13. The device as claimed in claim 12, wherein the decoder is arranged to update the content of the context buffer as the video processor proceeds along a line of pixels of a frame, by deleting at least one column of pixels on one side of the context portion and adding, on an opposite side of the context portion, at least one other column of decompressed pixels obtained by the decoder based on coding data retrieved from the line buffer for selected regions covering said other column of decompressed pixels.

14. The device as claimed in claim 12, wherein the line buffer has a first layer for receiving coding data representing first coefficients of at least one first scale for said plurality of regions spanning the stripe of lines, and a second layer for receiving coding data representing second coefficients of at least one second scale finer than said first scale for some of the regions of said plurality of regions spanning a narrower stripe of the frame, and wherein the decoder is arranged to generate the decompressed signal of the context portion by extracting coding data from both the first and second layers of the line buffer.

* * * * *